Nov. 16, 1954

G. C. MUSSER 2,694,420

REMOTE CONTROL SHIFTING APPARATUS
FOR TABLE TYPE GANG EDGERS

Filed Jan. 15, 1952

INVENTOR.
George C. Musser
BY Eugene D. Farley
Atty.

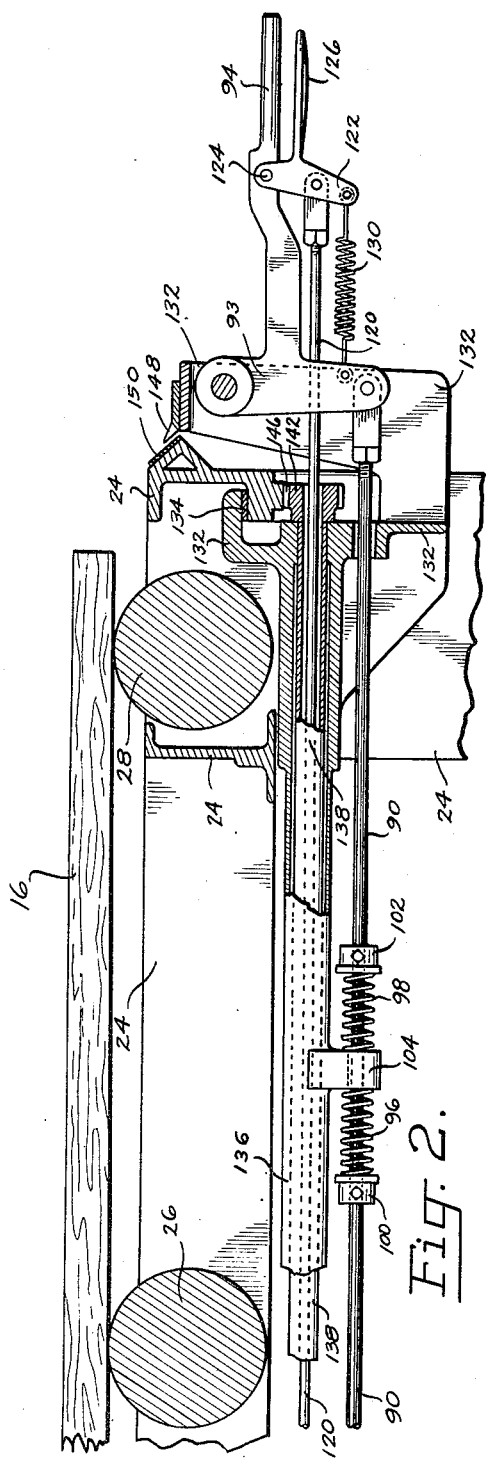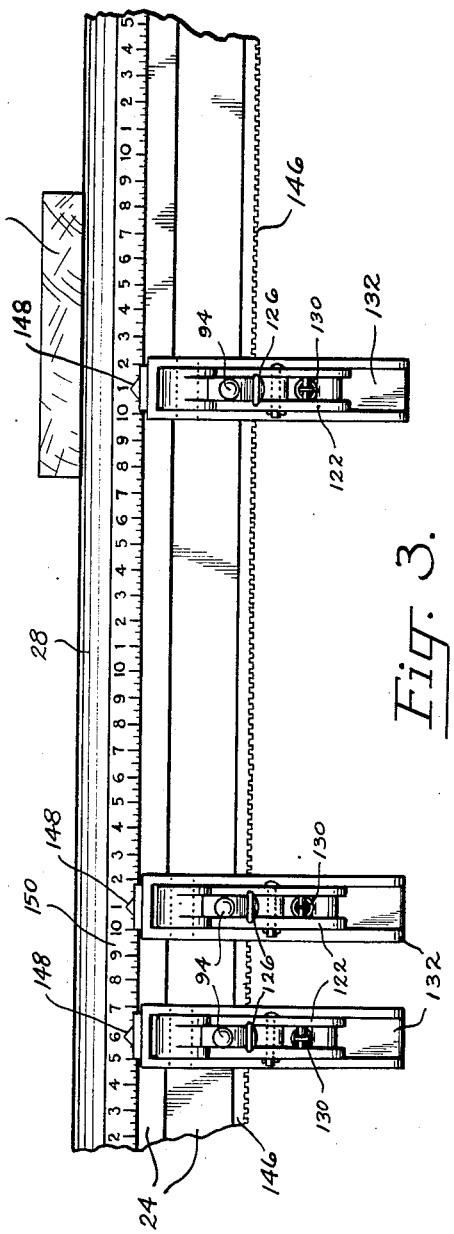
Fig. 2.
Fig. 3.
INVENTOR.
George C. Musser

Nov. 16, 1954

G. C. MUSSER 2,694,420

REMOTE CONTROL SHIFTING APPARATUS
FOR TABLE TYPE GANG EDGERS

Filed Jan. 15, 1952

INVENTOR.
George C. Musser
BY Eugene D. Farley
Atty.

ered Nov. 16, 1954

2,694,420

REMOTE CONTROL SHIFTING APPARATUS FOR TABLE TYPE GANG EDGERS

George C. Musser, Tacoma, Wash., assignor to Irvin W. Johnson, Tacoma, Wash.

Application January 15, 1952, Serial No. 266,504

2 Claims. (Cl. 143—37)

The present invention relates to improved sawmill machinery, specifically to improved remote control shifting apparatus for table type gang edgers.

In the operation of table type gang edgers comprising gang saws fed over a table of substantial length, it is necessary that the operator stand a substantial distance from the shifting carriage used for spacing the saws a predetermined distance apart for sawing lumber into boards of the desired width. Hence, it is necessary to provide remote control apparatus for operating the shifting carriage from the operator's station at the infeed side of the table.

The remote control apparatus heretofore provided for this purpose has been relatively unsatisfactory because it does not shift the saws with the necessary accuracy, thereby sawing boards of inaccurate dimensions and wasting lumber. Also, the prior art shifters have been difficult to operate, excessively subject to wear in operation, and difficult to maintain in adjustment.

It therefore is a primary object of the present invention to provide remote control shifting apparatus for table type gang edgers which is highly accurate in operation.

It is another object of the present invention to provide remote control shifting apparatus for table type gang edgers which is easy and safe to operate.

It is another object of the present invention to provide remote control shifting apparatus for table type gang edgers which has a long operating life and requires but little maintenance.

It is another object of the present invention to provide remote control shifting apparatus for table type gang edgers which is versatile, being adaptable to any of a plurality of types of gang saws associated with tables of varying dimensions and type.

It is another object of the present invention to provide remote control shifting apparatus for table type gang edgers which is of simple, inexpensive and durable construction.

The manner in which the foregoing and other objects of this invention are accomplished will be apparent from the following specification and claims considered together with the drawings, wherein like numerals of reference indicate like parts and wherein:

Figure 2 is a fragmentary view in side elevation and partly in section further illustrating the remote control shifting apparatus of Figure 1;

Figure 3 is a fragmentary view in front elevation of the apparatus of Figures 1 and 2.

Figure 1:
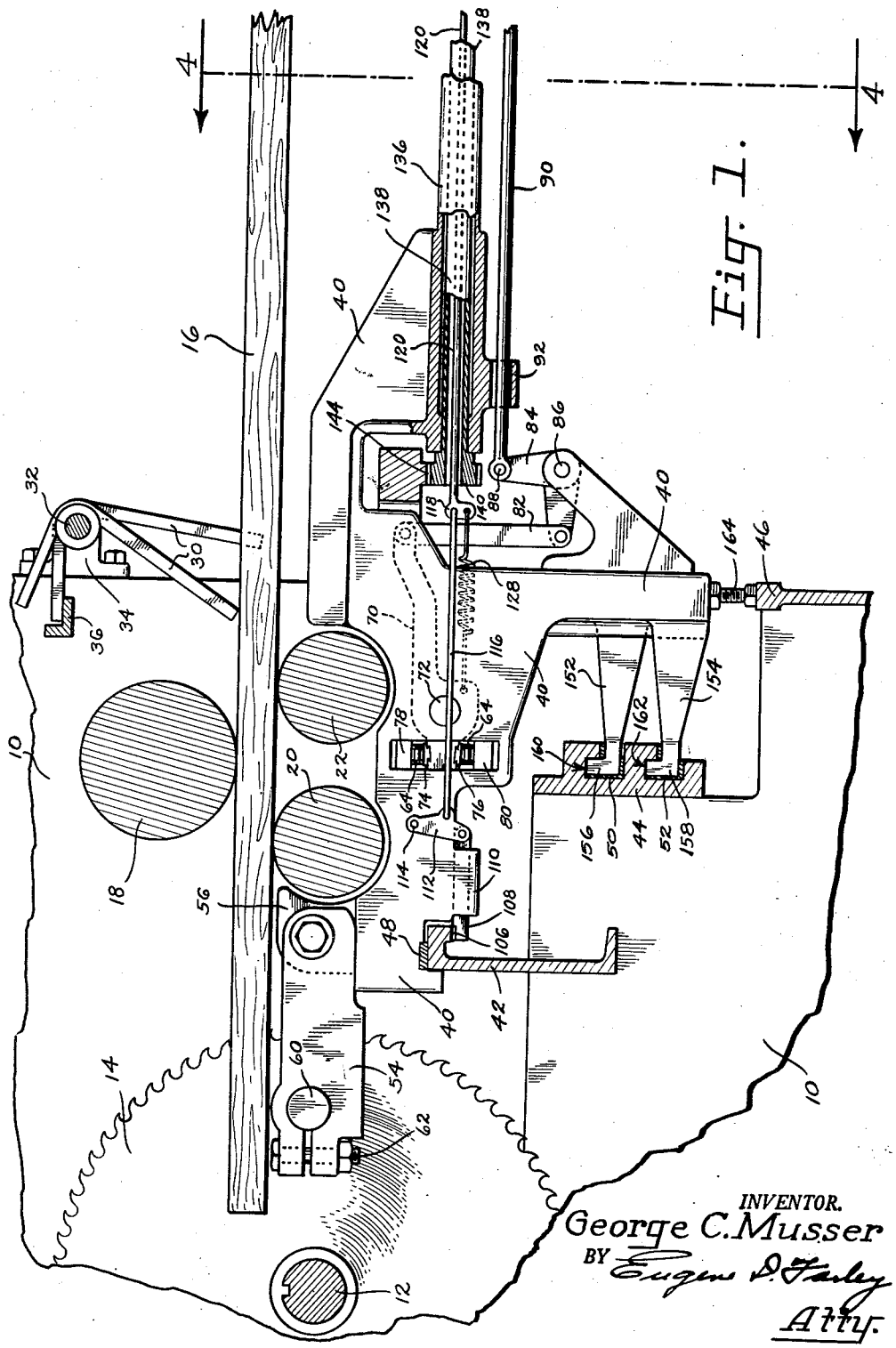
Figure 1 is a fragmentary view in side elevation, partly in section, of the presently described remote control shifting apparatus for table type gang edgers.

Briefly stated, the remote control shifting apparatus of my invention for table type gang edgers comprises a gang saw, the saws being axially adjustable on the saw arbor, together with saw shifters engageable one with each of the saws. A table for supporting the lumber to be sawed is placed adjacent the saws for feeding lumber thereto.

On the out-feed side of the table, i. e., intermediate the table and the saws, are a plurality of saw shifter carriages which support the saw shifters and more them laterally in the required manner. On the in-feed side of the table at the operator's station are a plurality of shifter indexing carriages, one for each of the saw shifter carriages. These, like the saw shifter carriages, are mounted for lateral movement.

Power means are provided for lateral driving of the saw shifter carriages to the right or to the left as required to set the saws. Power means also are provided for lateral driving of the shifter indexing carriages, the power means of the shifter indexing carriages being synchronized with the power means of the shifter carriages so that the two units move synchronously with each other. In this way, precise lateral adjustment of the saws is obtained.

Considering the foregoing in greater detail and with particular reference to the drawings:

The frame of a gang saw is indicated generally at 10. Rotatably mounted on the frame is the saw arbor or shaft 12 driven from a suitable power source. Splined to the arbor and mounted thereon for lateral or axial adjustment are a plurality of rotary saws, one of which is indicated at 14.

Saws 14 are spaced apart and arranged for sawing a plank 16 into boards of predetermined width. To this end the plank is fed to the saws through feed rollers 18, 20, 22, which are rotatably mounted on frame 10 and one or more of which are power driven for driving the plank into the saws.

The trailing portion of plank 16 is supported on a table indicated generally at 24 (Figure 2) and having rotatably mounted thereon a plurality of rollers 26, 28, the purpose of which is to support the plank during its travel toward the saws. To shield the operator from flying fragments during the sawing operation, there are provided a plurality of angular guard members 30. These form a screen at the mouth of the saw unit and are rotatably mounted on a shaft 32 attached to bracket 34 which in turn may be bolted to the frame of the apparatus. A support member 36 also may be provided for supporting the guard members so that they normally present a substantially continuous vertical surface which serves as a screen to catch splinters and flying fragments.

The saw shifter employed for shifting the saws laterally on arbor 12 comprises a shifter carriage 40 which is slidably supported on structural members 42, 44 and 46 of frame 10. To compensate for wear there are provided the renewable wear plate 48 associated with structural member 42, and plates 50 and 52 associated with structural member 44.

The saw shifters themselves each comprise a pair of arms, one of which is indicated at 54, bolted on standard 56. Arms 54 thus form a yoke straddling the saw and provided with transverse wooden plugs 60 which are renewable and clamped in position by means of bolts 62.

Figure 4:
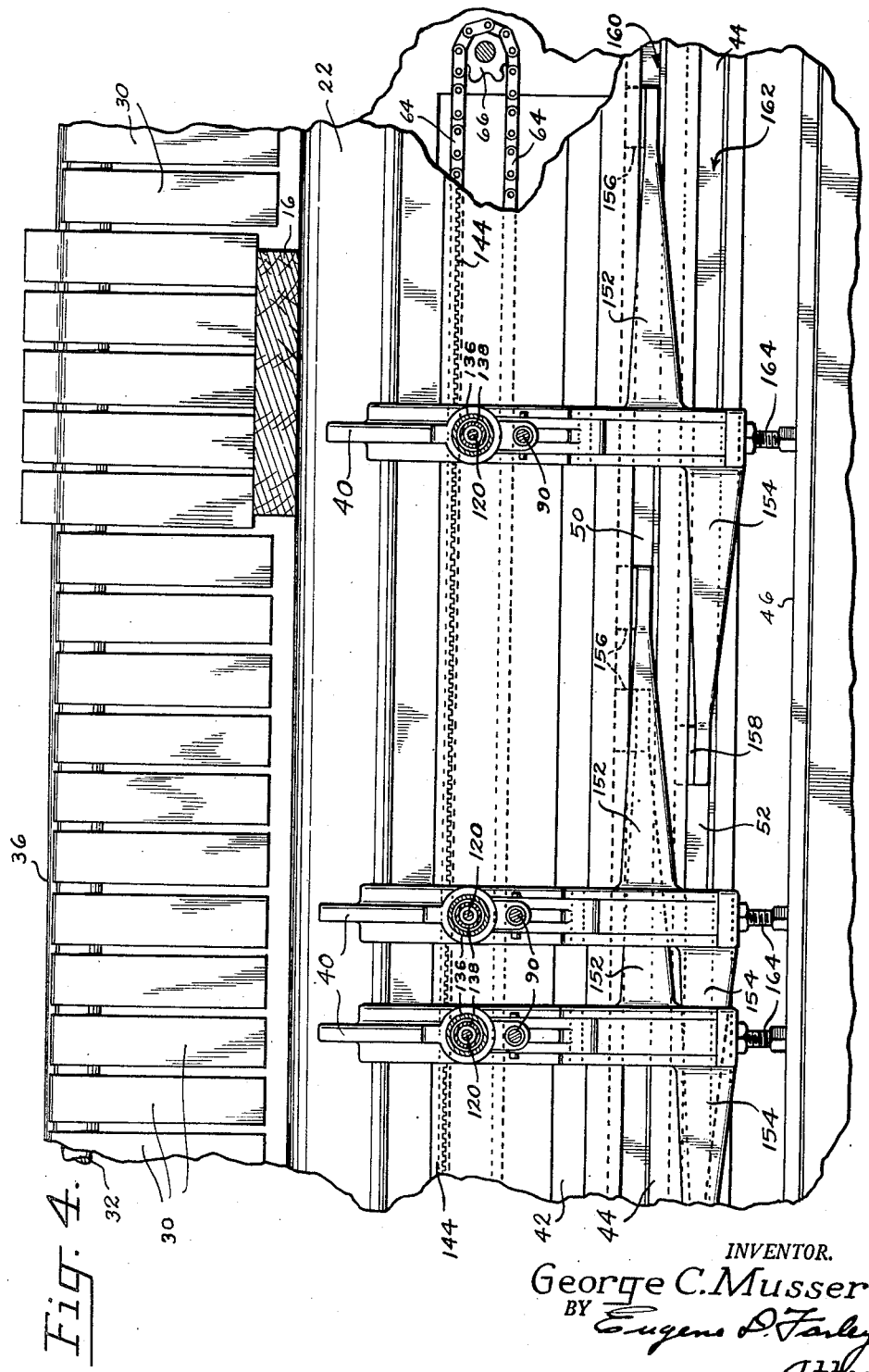
Figure 4 is a sectional view taken along the lines 4—4 of Figure 1.

Power means are provided for moving each shifter carriage, and hence the corresponding shifter, laterally as required to move the saw to a predetermined station on arbor 12. To this end there is provided a horizontally disposed endless chain 64 driven at a slow but uniform speed by sprockets 66 (Figure 4) mounted on opposite sides of the unit. It will be apparent that the upper and lower stretches of chain 64 move in opposite directions and therefore afford means of moving the saw shifter carriage either to the right or to the left depending upon to which stretch of the chain the carriage is connected.

Suitable connecting means for this purpose may comprise the lever arm 70 pivotally mounted intermediate its ends on pin 72 supported by the shifter carriage 40. As is particularly apparent from Figure 1, there are provided on the inner terminal portion of lever 70 a pair of grip blocks or shoes 74, 76 disposed respectively on the top and bottom surfaces of the lever. These cooperate with blocks 78, 80 on the shifter carriage so that when the inner end of lever 70 is moved upwardly, blocks 74 and 78 will exert a clamping pressure on the moving chain 64, thereby moving the carriage in a first direction. Similarly, if the inner end of lever 70 is moved downwardly, blocks 76 and 80 exert a clamping pressure on the lower stretch of chain 64, thereby moving the shifter carriage in the reverse direction.

Lever 70 is connected to the control lever stationed at the front of the table 24 through a suitable linkage including link 82 interconnecting lever 70 and bell crank 84 pivotally mounted on pin 86 attached to an extension of the shifter carriage 40. Pivotally attached through pin 88 to the other end of crank 84 is a rod 90. The latter is guided at its inner end by guide 92 attached to the shifter carriage 40. It extends the entire length of table 24 and is pivotally connected at its outer terminal portion to a lever arm 93 having attached thereto the operator's handle 94.

To maintain rod 90 and hence lever 70 normally in a neutral position wherein chain 64 is free to rotate without moving the shifter carriage, there is provided a centering mechanism including a pair of springs 96, 98 circling rod 90 and bearing respectively at one of their ends against the set collars 100, 102. At the other of their ends the springs bears against the opposite side faces of bracket 104 attached to a structural member of the assembly.

Latch means also are provided to lock the shifter carriage at its selected station. The latch means include the toothed bar 106 extending transversely of the saw assembly and attached to structural member 42 thereof. Cooperating with the toothed bar is the toothed latch 108 mounted for horizontal reciprocation in sleeve 110 attached to the shifter carriage 40. Latch 108 is operated through lever 112 pivotally attached to the shifter carriage 40 through pin 114.

Attached to lever 112 intermediate its ends is rod 116 which interconnects the lever and plate 118. The latter in turn is attached to one end of rod 120 which extends the length of table 24 and is connected at the other of its ends to lever 122. Lever 122 is pivotally attached through pin 124 to handle 94 and has the handle 126 extending horizontally outwardly spaced from and parallel to handle 94.

To maintain latch 108 normally in engagement with toothed bar 106, thereby locking the shifter carriage in position, there is provided a coiled spring 128 connected to plate 118 at one of its ends and to a member of the carriage assembly, for example, an extension of lever 70, at the other of its ends. Another spring for the same purpose is included at the outer terminal portion of rod 120, this being coil spring 130 connected at one of its ends to lever 93 and at the other to crank 122. It will be apparent that when handle 126 is moved toward handle 94, rod 90 will be moved outwardly against the tension of springs 128, 130. This will release latch 108 from toothed bar 106 and permit driving the shifter carriage to one side or the other by actuation of lever 94 operating rod 90 and lever 70.

Since control levers 94 and 126 operating respectively rods 90 and 120 are located adjacent the operator and a substantial distance away from the shifter carriage, it is necessary that means be provided for moving them and their associated mechanism laterally at a rate precisely commensurate with the movement of shifter carriage 40. Such means are provided in the shifter indexing carriage indicated generally at 132. This is supported on the table frame 24 by an extension bearing wear plate 134.

The shifter indexing carriage is connected to the shifter carriage and driven thereby through a long hollow casing 136. This encloses and rotatably mounts a hollow shaft 138. Shaft 138 has on its inner end the pinion gear 140 and on its outer end a corresponding pinion gear 142. These gears are of the same dimensions and have the same number of teeth. It will be noted also that hollow shaft 138 serves as a casing and mounting for rod 120 used for operating latch 108 as heretofore pointed out.

Secured transversely of the shifter carriage 40 is a rack 144. A corresponding rack 146 is secured to the infeed end of table frame 24. Racks 144 and 146 are dimensioned and stationed to engage with the teeth of pinions 140, 142 respectively. Thus, as shifter carriage 40 is driven to one side or the other by chain 64, it will carry with it casing 136. Pinion gear 146 on the shifter indexing carriage therefore will move tooth for tooth with pinion 140 on the shifter carriage 40.

As a result, the shifter indexing carriage will move synchronously with the shifter carriage and will maintain rods 90, 120 and tube 138 in precise alignment with each other and with the saw at all times. The extent of lateral displacement of the shifter carriage, and hence of the saws, therefore may be indicated by an index finger 148 rigidly attached to the shifter indexing carriage 132 reading on a suitably calibrated gauge 150 attached to the saw table frame 24.

Means also are provided for stabilizing the shifter carriage so that precise lateral adjustment may be obtained. In the illustrated embodiment the stabilizing means comprise a pair of laterally extending arms 152, 154 attached to shifter carriage 40. These arms spread a substantial distance to secure the necessary stabilizing effect. At their outer extremities they are provided with slide members or shoes 156, 158 respectively, which slide in tracks 160, 162 respectively on the structural member 44 of the saw frame hereinbefore referred to.

Arms 152, 154 thus serve in addition to a guiding and stabilizing function, a supporting function in that they support a substantial proportion of the weight of the shifter carriage 40. Since the arms necessarily spread to a considerable degree to secure the desired stabilizing and supporting result, tracks 160, 162 are spaced apart vertically from each other, thus enabling a plurality of the shifter carriages to be operated closely together in side by side relationship. When such is the case, the upper arm 152 of one carriage unit will overlap the lower arm of the adjacent carriage unit in the manner illustrated particularly in Figure 4.

Further to support each shifter carriage 40 there is provided a jack screw 164 which bears against the structural member 46 of the saw frame. By means of this screw, an adjustment in vertical position of the shifter carriage may be obtained as necessary to preserve accurate alignment of the members of the assembly.

Operation

It will be apparent from the foregoing that in a gang edger one of the described shifting mechanisms, including a chain gripping lever 70, a latch 108, connecting rods 90 and 120, and the hollow drive shaft 138, may be supplied for each of the saws of the edger. These units may be mounted side by side at suitable intervals on the frames of the saw and of the table in a manner indicated in Figures 3 and 4.

When the operator desires to set the saws 14 on arbor 12 he presses together handles 94 and 126 of the assembly operating the saw to be shifted. This releases latch 108 and permits movement of the shifter carriage. Such movement may be obtained by pressing down or elevating lever 94. Through operation of crank 84 and lever 70, this will result in engagement of the upper or lower stretches of chain 64 as desired. Since these move continuously in opposite directions, the saw will be moved correspondingly, depending upon which stretch of the chain is engaged.

After the saw has been moved, lever 94 is returned to its neutral position where it is maintained by springs 96, 98. Lever 126 also is released, whereupon the tension of springs 128, 130 will urge latch 108 into engagement with toothed bar 106, thereby locking the assembly in a position indicated by index finger 148 on gauge 150. In a similar manner the other units of the saw assembly may be set so that boards of the desired width are sawed.

Thus, it will be apparent that by the present invention I have provided a remote control shifting apparatus for table type gang edgers which is precise and positive in operation. Furthermore, the apparatus is safe and easy to operate, requires a minimum of maintenance, and retains its precision over long operating periods. Still further, it is versatile and may be adapted for use with any one of a number of different types of gang edgers.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. Remote control shifting apparatus for table type edgers comprising an axially movable saw, a saw shifter carriage mounted for lateral movement adjacent the saw, a saw shifter on the shifter carriage, a lumber feeding table interposed between the shifter carriage and the shifter indexing carriage, a transversely disposed rack adjacent the shifter carriage, a transversely disposed rack adjacent the shifter indexing carriage, a hollow shaft interconnecting the shifter carriage and the shifter indexing carriage, a pair of pinions attached one to each end of the shaft and engageable respectively with the shifter carriage rack and the shifter indexing carriage rack, power means for lateral driving of the shifter carriage, thereby synchronously driving the shifter indexing carriage through the shaft pinions, and latch means for releasably locking the shifter carriage in a selected one of a plurality of stations relative to the same, and actuator means extending slidably through the hollow shaft and connected to the latch means for operating the latter from the remote position of the shifter indexing carriage.

2. Remote control shifting apparatus for table type edgers comprising an axially movable saw, a saw shifter carriage mounted for lateral movement adjacent the saw, a saw shifter on the shifter carriage, a shifter indexing carriage, a transversely disposed rack adjacent the shifter carriage, a transversely disposed rack adjacent the shifter indexing carriage, a hollow shaft disposed substantially at right angles to the racks adjacent the shifter carriage and the shifter indexing carriage, a pair of pinions attached one to each end of the shaft and engageable respectively with the racks adjacent the shifter carriage and the shifter indexing carriage, a rotary driving chain arranged transversely of the shifter carriage, lever means on the shifter carriage for selectively gripping the upper and lower stretches of the chain, thereby laterally driving the shifter carriage and the shifter indexing carriage synchronously with each other through the shaft and pinions thereon, actuator means supported adjacent its ends on the shifter carriage and the shifter indexing carriage and connected to the lever means for operating the latter from the remote position of the shifter indexing carriage, latch means on the shifter carriage for releasably locking the same in a selected one of a plurality of stations relative to the saw, and actuator means extending slidably through the hollow shaft and connected to the latch means for operating the latter from the remote position of the shifter indexing carriage.

References Cited in the file of this patent

UNITED STATES PATENTS

| Number | Name | Date |
|---|---|---|
| 201,198 | Randolph | Mar. 12, 1878 |
| 406,458 | Muller | July 9, 1889 |
| 461,747 | Fisher | Oct. 20, 1891 |
| 702,592 | Roe | June 17, 1902 |
| 1,344,203 | Hagmaier | June 22, 1920 |
| 1,650,613 | Dorman | Nov. 29, 1927 |
| 1,835,041 | Hagmaier et al. | Dec. 8, 1931 |